(12) United States Patent
Kundu et al.

(10) Patent No.: US 7,287,228 B2
(45) Date of Patent: Oct. 23, 2007

(54) ON-DEMAND AND INCREMENTAL APPLICATION ADAPTATION

(75) Inventors: Ashish Kundu, Orissa (IN); Amit Anil Nanavati, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 10/729,300

(22) Filed: Dec. 5, 2003

(65) Prior Publication Data

US 2005/0125510 A1  Jun. 9, 2005

(51) Int. Cl.
G06F 3/00  (2006.01)
G06F 15/16  (2006.01)
(52) U.S. Cl. ............... 715/745; 715/744; 709/219
(58) Field of Classification Search ........... 715/744, 715/745
See application file for complete search history.

(56) References Cited

U.S. PATENT DOCUMENTS

| 6,055,569 | A | * | 4/2000 | O'Brien et al. | ............ | 709/223 |
| 6,957,390 | B2 | * | 10/2005 | Tamir et al. | ............ | 715/744 |
| 7,028,261 | B2 | * | 4/2006 | Smyth et al. | ............ | 715/744 |
| 2001/0049286 | A1 | | 12/2001 | Hansmann et al. | | |
| 2002/0112081 | A1 | | 8/2002 | Armstrong et al. | | |
| 2002/0133569 | A1 | * | 9/2002 | Huang et al. | ............ | 709/219 |
| 2002/0140742 | A1 | | 10/2002 | Lection et al. | | |

FOREIGN PATENT DOCUMENTS

EP  0964990 A2  9/1998

OTHER PUBLICATIONS

Fernando Boavida, Edmundo Monteiro, Joao Orvalho (Eds.), "Protocols and Systems for Interactive Distributed Multimedia", Joint International Workshops on Interactive Distributed Multimedia Systems and Protocols for Multimedia Systems, IDMS/PROMS 2002, Coimbra. Portuga, Nov. 26-29, 2002, Proceedings.

Dehashis Saha, Amitava Mukherjee, "Pervasive Computing: A Paradigm for the 21st Century", Perspectives, Published by the IEEE Computer Society, Mar. 2003, pp. 25-31.

Panos K. Chrysanthis, Vladimir I. Zadorozhny, "From Location Databases to Pervasive Catalog", Proceedings of the 13th International Workshop on Database and Expert Systems Applications, (DEXA '02), IEEE, 2002, pp. 1-7.

(Continued)

Primary Examiner—Tālivaldis Ivars Šmits
Assistant Examiner—Samuel G Neway
(74) Attorney, Agent, or Firm—Gibb & Rahman, LLC

(57) ABSTRACT

Components of an application that may be requested by a user in the future are identified and adapted for operation with a device of the user in response to a request for a component of the application by the user. Optionally, only the requested and identified components are adapted for operation with the requesting device, which may enable component adaptation within a specified maximum time period. A reachability analysis may be performed to identify components reachable from the requested component and components that are within a specified distance of the requested component may be identified or selected. The identified components may further be selected or identified based on historical request patterns relating to the application.

27 Claims, 4 Drawing Sheets

OTHER PUBLICATIONS

Zhijun Lei, Nicolas D. Georganas, "Context-Based Media Adaptation In Persavive Computing", Multimedia Communications Research Laboratory School of Information Technology and Engineering, University of Ottawa, Ottawa, Ontario, Canada, pp. 913-918, 2001.

Tim Edmonds, Steve Hodges, Andy Hopper, "Pervasive Adaptation for Mobile Computing", IEEE Xplore, Information Networking, 2001, Proceedings 15th International Conference, Jan. 31-Feb. 2, 2001, pp. 111-118.

Jon Inouye, Jim Binkley, Jonathan Walpole, "Dynamic Network Reconfiguration Support for Mobile Computers", 1997 ACM, pp. 1-10.

John Grundy, Biao Yang, "An Environment for Developing Adaptive, Multi-Device User Interfaces", Fourth Australasian User Interface Conference, Conferences in Research and Practice in Information Technology, vol. 18, 2002, 10 Pages.

Guruduth Banavar, James Beck, Eugene Gluzberg, Jonathan Munson, Jeremy Sussman, Deborra Zukowski, "Challenges: An Application Model for Pervasive Computing", Sixth Annual ACM/IEEE International Conference on Mobile Computing and Networking (Mobicom 2000), pp. 266-274.

* cited by examiner

ON-DEMAND AND INCREMENTAL APPLICATION ADAPTATION

FIELD OF THE INVENTION

The present invention relates to computer software applications and more particularly to adaptation of such applications for operation with a requesting device.

BACKGROUND

Computer software applications may be accessed by a variety of devices remotely via a network. Generally, such applications require adaptation for operation with the particular devices requesting or accessing the application. Adaptation is typically performed either when designing/implementing or deploying an application. However, an application may be adapted for a particular requesting device "on demand" (i.e., at the time of the actual request). Furthermore, the type of accessing device may be known or unknown to the application, at the time of a request.

For the case of a known type of requesting device, the current approach is to adapt and store the entire application prior to access, which disadvantageously results in significant resource utilization such as processing time and memory.

For the case of unknown device types, the current approach is also to adapt the entire application. In addition to the aforementioned disadvantages associated with known device types, other disadvantages such as an increased response time (user waiting time) and an increased difficulty to support in terms of Quality of Service (QoS) also exist in relation to unknown device types.

U.S. patent application No. 2001/0049286A1, entitled "Device registry server for automatic connection and data exchange between pervasive devices and backend systems" was published on Dec. 6, 2001 in the name of Hansmann, et al. and is assigned to International Business Machines (IBM) Corporation. The specification relates to communication improvements between a mobile device and backend system applications. However, a backend application that has already been customised for use with the mobile device is assumed.

A paper by Indulska et al., entitled "Vertical handover based adaption for multimedia applications in pervasive systems", is included in the Proceedings of the Joint International Workshop on Interactive Distributed Multimedia Systems and Protocols for Multimedia Systems (IDMS/PROMS 2002). However, the form of adaptation described is context-based and uses context information relating to user devices, user location, application requirements and network environment.

A need exists for incremental adaptation of computer software applications in response to user requests.

SUMMARY

According to aspects of the present invention, there are provided a method, an apparatus and a computer program product for on-demand and incremental application adaptation.

Components of an application that may be requested by a user in the future are identified and adapted for operation with a device of the user in response to a request for a component of the application by the user. Optionally, only the requested and identified components are adapted for operation with the requesting device, which may enable component adaptation within a specified maximum time period.

A reachability analysis may be performed to identify components reachable from the requested component and components that are within a specified distance of the requested component may be identified or selected. The identified components may further be selected or identified based on historical request patterns relating to the application.

BRIEF DESCRIPTION OF THE DRAWINGS

Embodiments are described hereinafter, by way of example only, with reference to the accompanying drawings in which.

DETAILED DESCRIPTION

A method, an apparatus and a computer program product are described herein for incremental on-demand adaptation of a computer software application. The method, apparatus and computer program product are described with specific reference to applications accessible via the Internet, however, it is not intended that the present invention be so limited as the principles of the present invention have general applicability to other networks such as private or proprietary networks.

Applications accessed by a client should be compatible with specific requirements of the client. The client may comprise a device with hardware requirements such as screen size, screen resolution, image display capability, memory available for an application, CPU speed, bandwidth, etc. Software requirements of a client device may, for example, comprise the markup language supported by a browser hosted on the client (e.g., WML 1.3), client-side scripts if any, and the kind of operating system support available. An application may comprise a generic application. However, other kinds of application may be specifically written for a set of clients/devices having similar capabilities. Such applications need to be adapted to meet the client/device requirements. The components of the application that are processed on the device side and the data sent to the device need to be adapted.

For example, consider a web application developed for a generic client. The application comprises two types of components—the view (e.g., HTML or WML pages), which is written in a markup language to perform user interaction, and the component that contains data and/or business logic (e.g., java bean). The web application is deployed on the server side. When a client accesses the application, a view is sent to the client based on the user input. Each view acts as a node in an application flow graph and the java bean invocations act as edges from one node to the other. Since the view is displayed on the client side, the view needs to be in a markup language supported by the device browser and must meet the memory limit. Any images that the device browser cannot display or that result in a page size greater than the memory limit must be discarded. Thus, the views for the web applications on the server side need to be adapted to the requirements of each client/device.

Figure 1:
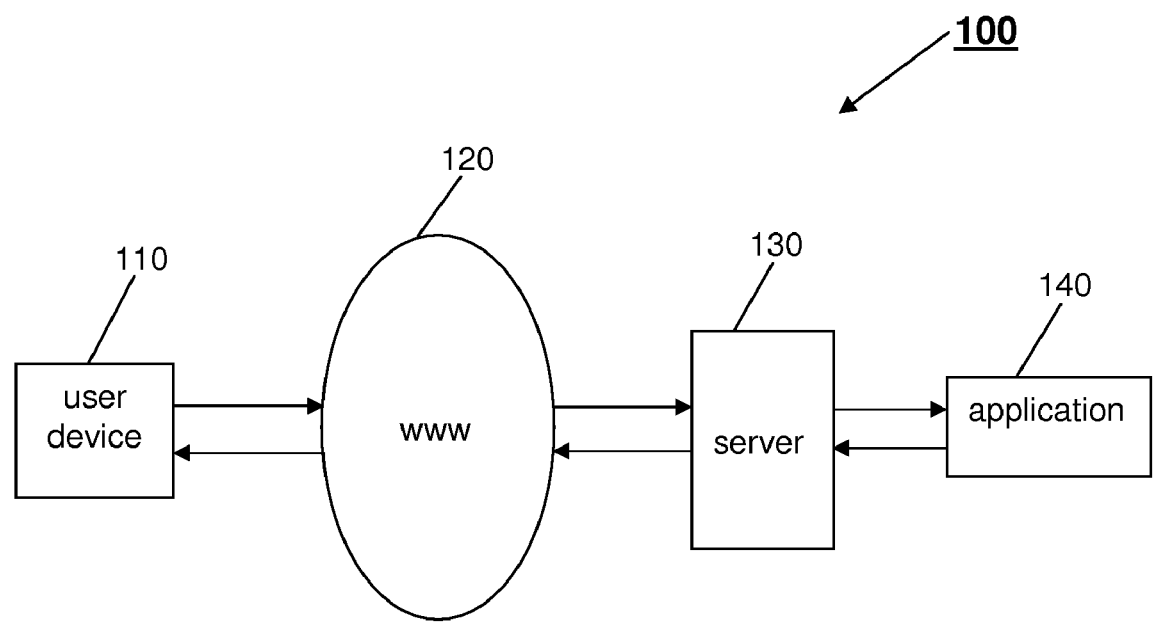
FIG. 1 is a schematic representation of a network environment in which embodiments of the present invention can be practised.

FIG. 1 shows a network environment in which embodiments of the present invention can be practised. A remote device 110 accesses a computer software application 140 via the Internet 120 and a server 130. The application 140 may be hosted on the server 130 or on a further server (not shown). The remote device 110 may comprise a computing device such as a personal computer (PC), a personal digital assistant (PDA), a mobile telephone, or any other commercially available or proprietary computing device. Modifications to the network environment of FIG. 1, as well as alternative network environments are also suitable for practising embodiments of the invention, as would be well understood by a person skilled in the art. For example, the network is not restricted to the single remote device 110, but may comprise numerous remote devices for accessing the application 140 that are similar or dissimilar to the remote device 110.

Figure 2:
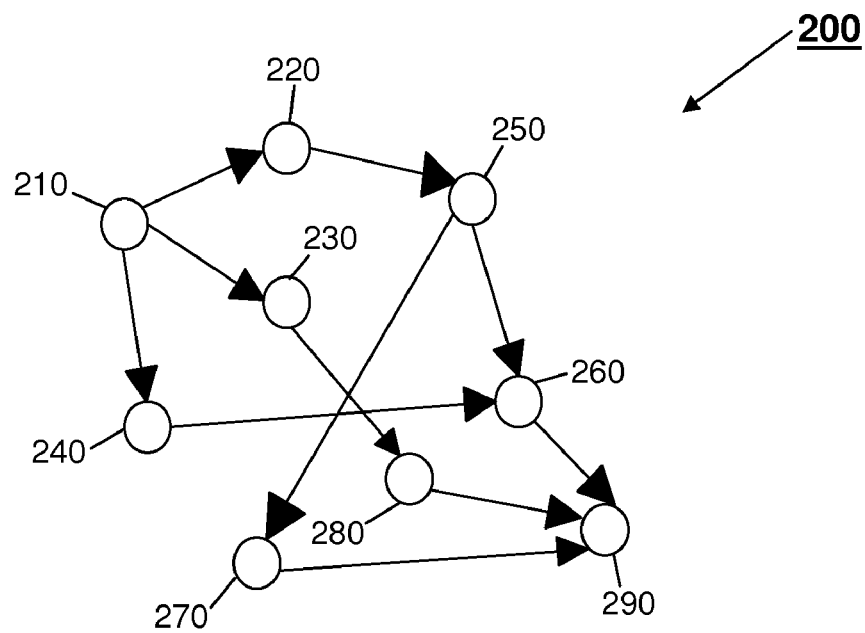
FIG. 2 is a flow graph of a computer software application.

FIG. 2 shows a flow graph 200 of a computer software application, such as application 140 in FIG. 1, in which each vertex denotes a component of the application 140 and each edge denotes a transition between components. For example, the components of the application 140 may comprise pages available on an Internet website. A transition may thus represent a selection of a particular component (page) by a user of the remote device 110. Each component that is accessed by a user of the remote device 110 requires adaptation for use by the remote device 110. Similarly, each component that is accessed by a remote device that is different to the remote device 110 requires adaptation for use by that remote device.

Figure 3:
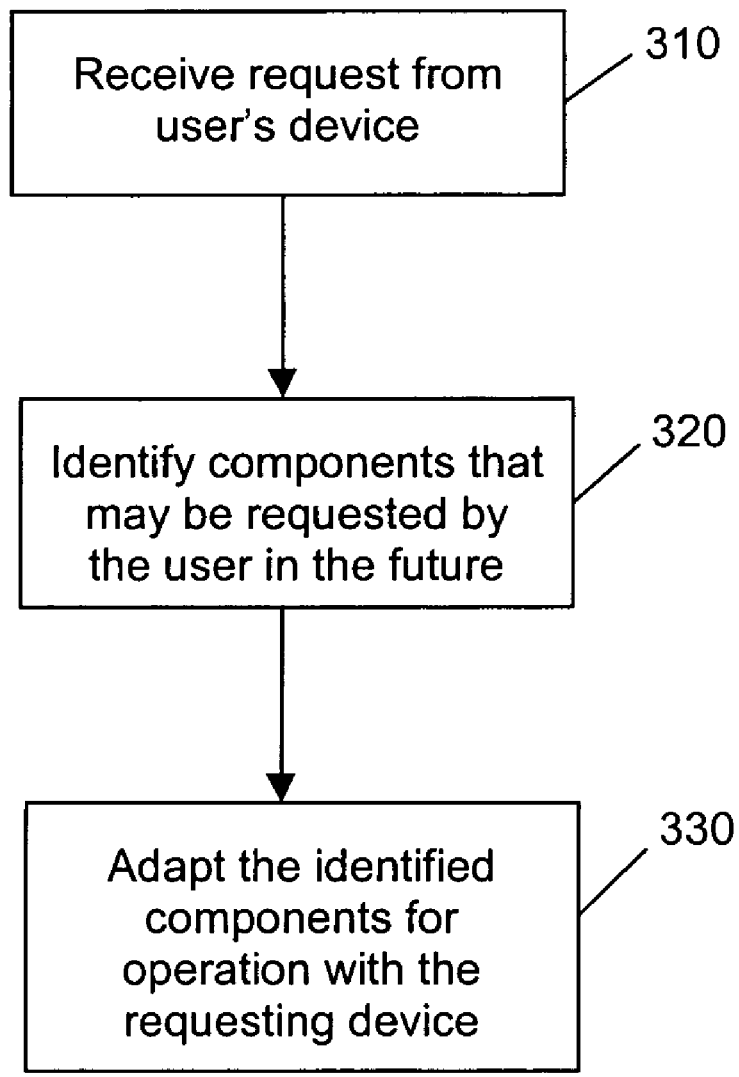
FIG. 3 is a flow diagram of a method for adapting components of a computer software application in accordance with an embodiment of the present invention.

FIG. 3 shows a method for adaptation of components of a computer software application. A request from a device operated by a user of the application is received at step 310. Components of the application that may be requested by the user are identified, at step 320, in response to the request. At step 330, the identified components are adapted for operation with the requesting device.

The identified components may be adapted within a specified maximum time period to comply with Quality of Service (QoS) constraints. The components for adaptation may be identified based on a representation of possible control flow paths through the application that can be selected by a user. Components of the application may comprise Internet webpages selected by the user. Components of the application that are not likely to be requested by the user are preferably not adapted to conserve system resources and improve system response time.

Various methods may be used to identify components of an application for adaptation based on a component currently selected by a user. Examples of such methods comprise graph analysis and methods based on statistical algorithms, learning algorithms, and response-time algorithms.

Graph Analysis

Graph analysis can be used to identify subgraphs in a dependency graph. Each subgraph is then adapted in its entirety (i.e., including articulation points, bridges, loops, prefetching techniques, etc.). For example, a reachability analysis is performed to determine the set of components that are reachable from the current component. Then, only the reachable components are adapted.

For purposes of the present disclosure, the graph comprises an application flow graph. An articulation point is a node apart from the root node that, when removed, breaks the graph into more than one component. A bridge comprises an edge of the graph, whose removal causes the graph to become disconnected. A loop comprises a cycle in the graph.

Referring to the flow graph 200 of FIG. 2, the component 270 is unreachable from the component 230. The components 230, 250 and 240 are exclusive of each other; that is, each of the components 230, 250 and 240 cannot be reached from each other. The component 280 is likely to be requested by a user from the component 230. The component 270 need not be adapted when the component 230 is the current component since the component 270 is unreachable from the component 230. The component 290 can always be adapted since this component is likely to be visited from all paths of the flow graph 200.

Statistical

The statistical method is based on patterns of components previously requested or selected by users. Only the components most likely to be selected or requested by a user are adapted for the user's particular device. For this method, it is assumed that historical patterns of user traversals through a flow graph are stored. Then, the probability of user selection of each component reachable from a current component is computed. Assuming that a component (b) is reachable from a component (a), the probability of selection of component (b) from component (a) is determined according to a Bayesian method as follows:

$$\text{probability}(b \mid a) = \frac{\text{Number of paths in which "}a - b\text{" occurs}}{\text{Number of paths in which "}a - ?\text{" occurs}}$$

As an example, suppose that the component 250 is more often followed by the component 260 than the component 270 in user traversals of the application represented by FIG. 2. In accordance with the statistical method, the component 260 should be adapted earlier than the component 270. Moreover, the component 270 need not be adapted until specifically requested by a user.

Learning

In the learning method, an embedded learning algorithm learns from historical request patterns and previously incorrect predictions to dynamically identify the most likely components to be requested. The method may be implemented using a reinforcement learning algorithm that associates a penalty with wrong prediction and biases the probability of selection of successive components more towards recent historical patterns than older historical patterns.

As an example using the flow graph 200 in FIG. 2, it is possible that although the component 250 may have most often been followed by the component 260 historically, the component 250 has more recently been followed by the component 270, particularly for a user U. The probability of selection of the component 270 from the component 250 will thus be higher than the probability of selection of the component 260 from the component 250, particularly for the user U. Consequently, the priority for adaptation of the component 270 should be higher than the priority for adaptation of the component 260 for the user U.

Response-time

In this method, the maximum number of components in the neighbourhood of the current component that can be adapted within a desired response-time are adapted. Firstly, the times $t_i$ required to adapt each respective component $C_i$ are calculated. Then, given a maximum response time T and starting from the current component, the times $t_i$ are added in BFS (Breadth First Search) order until the sum of the added times is less than, but as close as possible to, the maximum response time T. A BFS order is the order of traversing a graph such that when a particular node is visited, then all the neighbour nodes of that node are also visited.

Embodiment Using Graph Analysis

Figure 4:
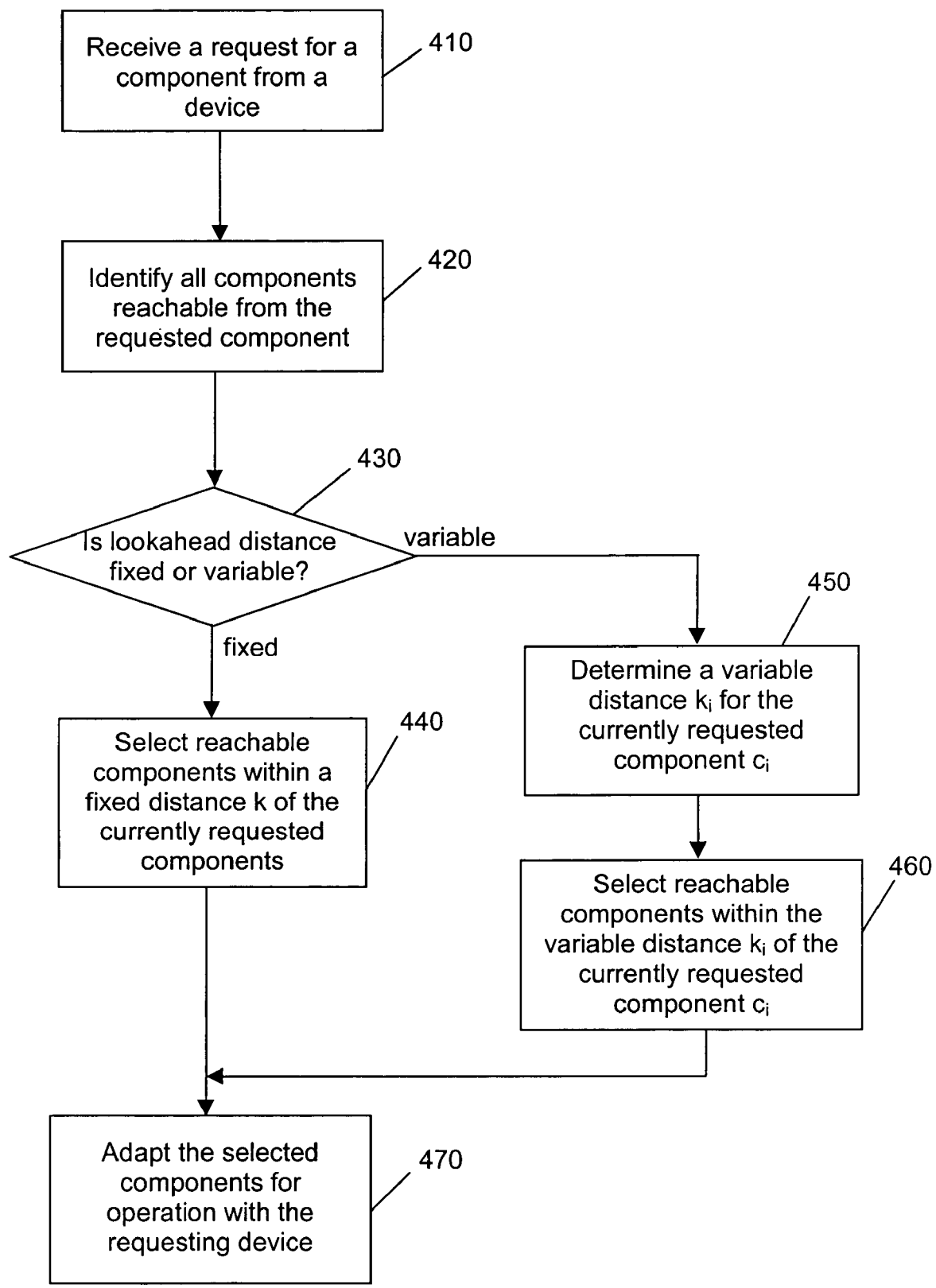
FIG. 4 is a flow diagram of an algorithm for identifying and adapting components of a computer software application in accordance with another embodiment of the present invention.

FIG. 4 shows a method for identifying and adapting components of an application using graph analysis.

A request for a component of the application is received from a device at step 410. If a particular component is not specified, the starting component of the application is selected as the requested component. At step 420, components reachable from the requested component are identified by performing a reachability analysis. A determination is made at step 430 whether the lookahead distance is fixed or variable. A lookahead distance comprises an integer value greater than or equal to one and is representative of a number of transitions between two components. For example, the distance between the components 210 and 240 in FIG. 2 is 1, the distance between the components 210 and 280 is 2, and the distance between the components 220 and 290 is 3. In cases where different lookahead distances are applied to different components, a variable lookahead distance $k_i$ may be determined for each component $c_i$. The distances k and $k_i$ may be determined in accordance with Quality of Service (QoS) constraints. Factors for determination may comprise the amount of time necessary for adapting one or more components and/or how long a user takes to respond to a current request, if at all. A high value of lookahead distance is generally desirable, particularly where resource capacity is available. However, too high a value of distance k may result in unacceptably long response times for a user.

If the lookahead distance is fixed, reachable components within a fixed distance k of the currently requested component are selected and processing continues at step 470. If the lookahead distance is variable, a variable distance $k_i$ is determined for the currently requested component $c_i$, at step 450. Reachable components within the distance $k_i$ of the currently requested component $c_i$ are selected, at step 460. Thereafter, the components selected in step 440 or step 460 are adapted for operation with the requesting device, at step 470. Any of the components already adapted for operation with the requesting device need not be adapted again.

Referring to the flow graph 200 of FIG. 2, assume that that the distance k=1 (by selection) and that the components of the flow graph 200 have not yet been adapted to a particular device or set of devices having common characteristics pertinent to the adaptation. Upon a request from a user, the component 210 is adapted. During or after adaptation of the component 210, the components 220, 230 and 240 are identified to be reachable within the distance k=1 from the component 210. Components requiring adaptation can be identified during adaptation of another component by execution of an algorithm in multiple threads. Upon completion of adaptation of the component 210, the components 220, 230 and 240 are adapted. If the user's next request is for the component 230, only the component 280 will be identified for adaptation on account of being within the distance k=1 from the component 230. However, if the user's next request is for the component 220, only the component 250 will be identified for adaptation on account of being within the distance k=1 from the component 220.

Computer Hardware and Software

Figure 5:
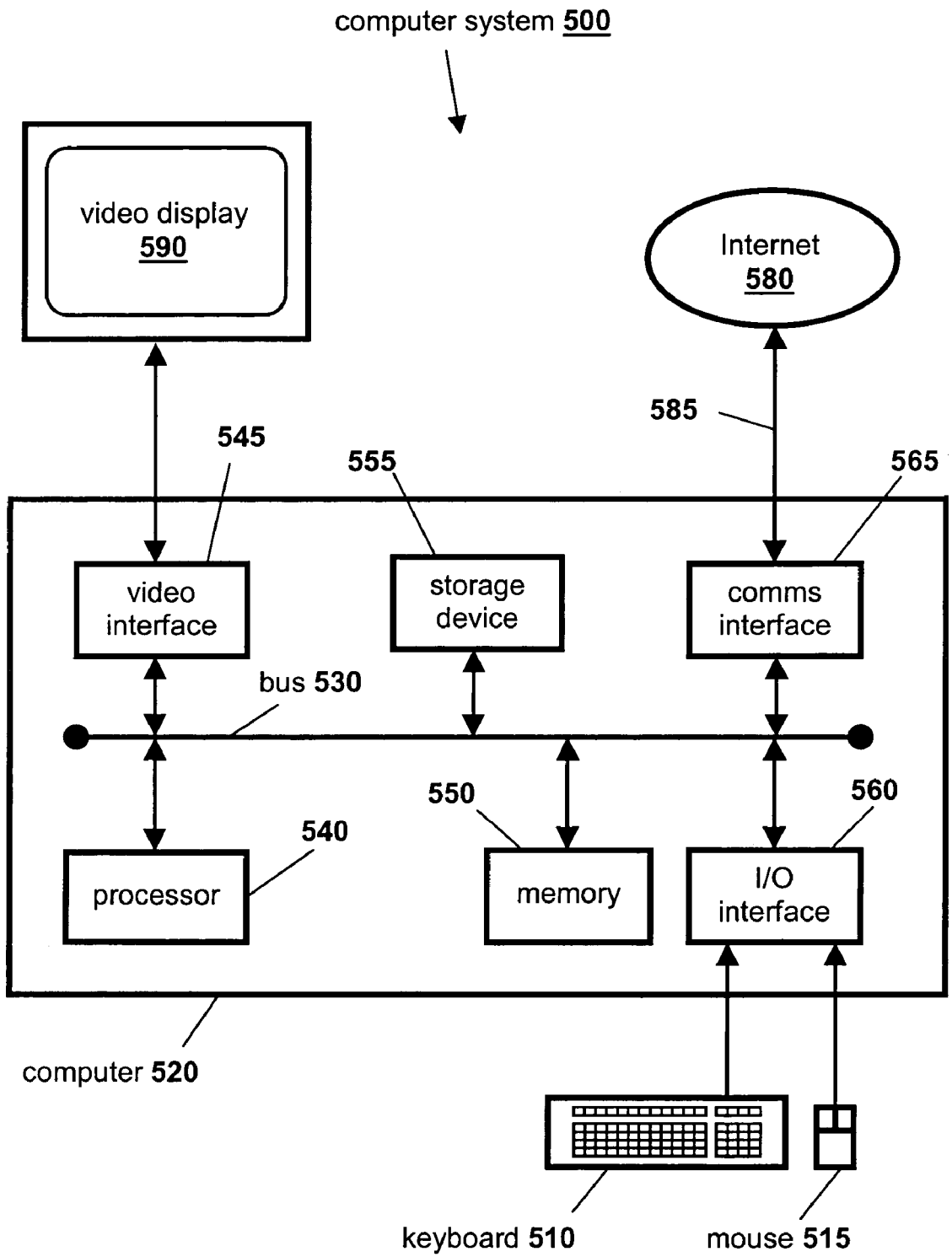
FIG. 5 is a schematic representation of a computer system wherewith embodiments of the present invention may be practised.

FIG. 5 is a schematic representation of a computer system 500 that can be used to practise the methods described herein. Specifically, the computer system 500 is provided for executing computer software that is programmed to assist in performing a method for adaptation of a computer software application. The computer software executes under an operating system such as MS Windows XP™ or Linux™ installed on the computer system 500.

The computer software involves a set of programmed logic instructions that may be executed by the computer system 500 for instructing the computer system 500 to perform predetermined functions specified by those instructions. The computer software may be expressed or recorded in any language, code or notation that comprises a set of instructions intended to cause a compatible information processing system to perform particular functions, either directly or after conversion to another language, code or notation.

The computer software program comprises statements in a computer language. The computer program may be processed using a compiler into a binary format suitable for execution by the operating system. The computer program is programmed in a manner that involves various software components, or code means, that perform particular steps of the methods described hereinbefore.

The components of the computer system 500 comprise: a computer 520, input devices 510, 515 and a video display 590. The computer 520 comprises: a processing unit 540, a memory unit 550, an input/output (I/O) interface 560, a communications interface 565, a video interface 545, and a storage device 555. The computer 520 may comprise more than one of any of the foregoing units, interfaces, and devices.

The processing unit 540 may comprise one or more processors that execute the operating system and the computer software executing under the operating system. The memory unit 550 may comprise random access memory (RAM), read-only memory (ROM), flash memory and/or any other type of memory known in the art for use under direction of the processing unit 540.

The video interface 545 is connected to the video display 590 and provides video signals for display on the video display 590. User input to operate the computer 520 is provided via the input devices 510 and 515, comprising a keyboard and a mouse, respectively. The storage device 555 may comprise a disk drive or any other suitable non-volatile storage medium.

Each of the components of the computer 520 is connected to a bus 530 that comprises data, address, and control buses, to allow the components to communicate with each other via the bus 530.

The computer system 500 may be connected to one or more other similar computers via the communications interface 565 using a communication channel 585 to a network 580, represented as the Internet.

The computer software program may be provided as a computer program product, and recorded on a portable storage medium. In this case, the computer software program is accessible by the computer system 500 from the storage device 555. Alternatively, the computer software may be accessible directly from the network 580 by the computer 520. In either case, a user can interact with the computer system 500 using the keyboard 510 and mouse 515 to operate the programmed computer software executing on the computer 520.

The computer system 500 has been described for illustrative purposes. Accordingly, the foregoing description relates to an example of a particular type of computer system suitable for practising the methods and computer program products described hereinbefore. Other configurations or types of computer systems can be equally well used to practise the methods and computer program products described hereinbefore, as would be readily understood by persons skilled in the art. For example, the methods and computer program products described hereinbefore can be practised using a handheld computer such as a Personal Digital Assistant (PDA) or a mobile telephone.

Conclusion

A method, an apparatus and a computer software product have been described hereinbefore for selectively adapting components of a computer software application. Advantageously, such components need only be adapted as and when required, thus enabling better utilization of computing resources and an improved Quality of Service (QoS) to users.

The foregoing detailed description provides exemplary embodiments only, and is not intended to limit the scope, applicability or configurations of the invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereinafter.

We claim:

1. A method for incremental adaptation of a computer software application, said method comprising:
   receiving a request for a component of said application from a device operated by a user of said application;
   identifying, in response to said request, components of said application that may be requested by said user in the future, wherein the identifying process comprises graph analysis, statistical analysis, learning analysis, and response-time analysis, wherein said learning analysis comprises associating a penalty with an incorrect prediction of said components of said application that may be requested by said user in the future and biases a probability of selection of successive components more towards recently occurring historical patterns than older historical patterns, and wherein in said response-time analysis a maximum number of components in the neighborhood of a current component that can be adapted within a desired response-time are adapted by:
   calculating the times required to adapt each respective component; and
   given a maximum response time and starting from said current component, adding said times in a breadth first search order until a sum of the added times reaches said maximum response time without exceeding said maximum response time; and
   adapting said identified components for operation with said requesting device,
   wherein only said requested and identified components are adapted for operation with said requesting device.

2. The method of claim 1, wherein components of said application comprise Internet webpages.

3. The method of claim 1, comprising the further step of:
   performing, in response to said request, a reachability analysis to identify components reachable from said requested component; and
   wherein said step of identifying comprises selecting components from said identified reachable components that are within a specified distance of said requested component.

4. The method of claim 3, wherein said specified distance comprises an integer value greater than or equal to one, said value representative of a number of transitions between two components of said application.

5. The method of claim 1, wherein said step of identifying comprises identifying components with a high probability of being requested based on historical request patterns relating to said application.

6. The method of claim 5, wherein said historical request patterns relate to requests from a substantially similar requesting device.

7. The method of claim 6, wherein said components are identified taking previously incorrect identification of components that may be requested into account.

8. The method of claim 1, wherein said step of identifying comprises identifying the maximum number of components neighboring said requested component that can be adapted within a specified period of time.

9. A method for incremental adaptation of a computer software application, said method comprising:
   receiving a request for a component of said application from a device;
   identifying, in response to said request, components reachable from said requested component, wherein the identifying process comprises graph analysis, statistical analysis, learning analysis, and response-time analysis, wherein said learning analysis associates a penalty with an incorrect prediction of said components reachable from said requested component and biases a probability of selection of successive components more towards recently occurring historical patterns than older historical patterns, and wherein in said response-time analysis a maximum number of components in the neighborhood of a current component that can be adapted within a desired response-time are adapted by:
   calculating the times required to adapt each respective component; and
   given a maximum response time and starting from said current component, adding said times in a breadth first search order until a sum of the added times reaches said maximum response time without exceeding said maximum response time;
   selecting components within a specified distance of said requested component from said identified reachable components; and
   adapting said selected components for operation with said requesting device,
   wherein only said requested and identified components are adapted for operation with said requesting device.

10. An apparatus for adaptation of a computer software application, said apparatus comprising:
   at least one communications interface for transmitting and receiving data;
   a memory unit for storing data and instructions to be performed by a processing unit; and
   a processing unit coupled to said at least one communications interface and said memory unit, said processing unit programmed to:

receive a request for a component of said application from a device operated by a user of said application;

identify, in response to said request, components of said application that may be requested by said user in the future, wherein the identifying comprises graph analysis, statistical analysis, learning analysis, and response-time analysis, wherein in said response-time analysis a maximum number of components in the neighborhood of a current component that can be adapted within a desired response-time are adapted by:

calculating the times required to adapt each respective component; and given a maximum response time and starting from said current component, adding said times in a breadth first search order until a sum of the added times reaches said maximum response time without exceeding said maximum response time;

associate a penalty with an incorrect prediction of said components of said application that may be requested by said user in the future and biases a probability of selection of successive components more towards recently occurring historical patterns than older historical patterns; and adapt said identified components for operation with said requesting device, wherein said processing unit is programmed to adapt only said requested and identified components for operation with said requesting device.

11. The apparatus of claim 10, wherein components of said application comprise Internet webpages.

12. The apparatus of claim 10, wherein said processing unit is further programmed to:

perform, in response to said request, a reachability analysis to identify components reachable from said requested component; and identify reachable components for adaptation that are within a specified distance of said requested component.

13. The apparatus of claim 12, wherein said specified distance comprises an integer value greater than or equal to one, said value representative of a number of transitions between two components of said application.

14. The apparatus of claim 10, wherein said processing unit is further programmed to identify components with a high probability of being requested based on historical request patterns relating to said application.

15. The apparatus of claim 14, wherein said historical request patterns relate to requests from a substantially similar requesting device.

16. The apparatus of claim 15, wherein said processing unit is further programmed to identify components taking previously incorrect identification of components that may be requested into account.

17. The apparatus of claim 10, wherein said processing unit is further programmed to identify the maximum number of components neighboring said requested component that can be adapted within a specified period of time.

18. An apparatus for adaptation of a computer software application, said apparatus comprising:

at least one communications interface for transmitting and receiving data;

a memory unit for storing data and instructions to be performed by a processing unit; and a processing unit coupled to said at least one communications interface and said memory unit, said processing unit programmed to:

receive a request for a component of said application from a device;

identify, in response to said request, components reachable from said requested component, wherein the identifying comprises graph analysis, statistical analysis, learning analysis, and response-time analysis, wherein said learning analysis associates a penalty with an incorrect prediction of said components reachable from said requested component and biases a probability of selection of successive components more towards recently occurring historical patterns than older historical patterns, and wherein in said response-time analysis a maximum number of components in the neighborhood of a current component that can be adapted within a desired response-time are adapted by:

calculating the times required to adapt each respective component; and given a maximum response time and starting from said current component, adding said times in a breadth first search order until a sum of the added times reaches said maximum response time without exceeding said maximum response time;

select components within a specified distance of said requested component from said identified reachable components; and adapt said selected components for operation with said requesting device, wherein said processing unit is programmed to adapt only said requested and identified components for operation with said requesting device.

19. A computer program product comprising a computer readable medium comprising a computer program recorded therein for performing a method for incremental adaptation of a computer software application, said method comprising:

receiving a request for a component of said application from a device operated by a user of said application;

identifying, in response to said request, components of said application that may be requested by said user in the future, wherein the identifying process comprises graph analysis, statistical analysis, learning analysis, and response-time analysis, wherein said learning analysis comprises associating a penalty with an incorrect prediction of said components of said application that may be requested by said user in the future and biases a probability of selection of successive components more towards recently occurring historical patterns than older historical patterns, and wherein in said response-time analysis a maximum number of components in the neighborhood of a current component that can be adapted within a desired response-time are adapted by:

calculating the times required to adapt each respective component; and given a maximum response time and starting from said current component, adding said times in a breadth first search order until a sum of the added times reaches said maximum response time without exceeding said maximum response time; and adapting said identified components for operation with said requesting device, wherein only said requested and identified components are adapted for operation with said requesting device.

20. The computer program product of claim 19, wherein components of said application comprise Internet webpages.

21. The computer program product of claim 19, wherein said method further comprises:

computer program code means for performing, in response to said request, a reachability analysis to identify components reachable from said requested component; and computer program code means for identifying components for adaptation from said reachable components that are within a specified distance of said requested component.

22. The computer program product of claim 21, wherein said specified distance comprises an integer value greater than or equal to one, said value representative of a number of transitions between two components of said application.

23. The computer program product of claim 19, wherein said method further comprises identifying components with a relatively higher probability of being requested based on historical request patterns relating to said application.

24. The computer program product of claim 23, wherein said historical request patterns relate to requests from a substantially similar requesting device.

25. The computer program product of claim 24, wherein said components are identified taking previously incorrect identification of components that may be requested into account.

26. The computer program product of claim 19 wherein said method further comprises identifying the maximum number of components neighboring said requested component that can be adapted within a specified period of time.

27. A computer program product comprising a computer readable medium comprising a computer program recorded therein for performing a method for incremental adaptation of a computer software application, said method comprising:

receiving a request for a component of said application from a device;

identifying, in response to said request, components reachable from said requested component, wherein the identifying process comprises graph analysis, statistical analysis, learning analysis, and response-time analysis, wherein said learning analysis associates a penalty with an incorrect prediction of said components reachable from said requested component and biases a probability of selection of successive components more towards recently occurring historical patterns than older historical patterns, and wherein in said response-time analysis a maximum number of components in the neighborhood of a current component that can be adapted within a desired response-time are adapted by:

calculating the times required to adapt each respective component; and given a maximum response time and starting from said current component, adding said times in a breadth first search order until a sum of the added times reaches said maximum response time without exceeding said maximum response time;

selecting components within a specified distance of said requested component from said identified reachable components; and adapting said selected components for operation with said requesting device, wherein only said requested and identified components are adapted for operation with said requesting device.

* * * * *